(12) United States Patent
Novak et al.

(10) Patent No.: US 6,860,496 B2
(45) Date of Patent: Mar. 1, 2005

(54) DOLLY SYSTEM FOR VEHICLE MOVEMENT

(75) Inventors: William J. Novak, Omaha, NE (US); Doug S. Bailey, Omaha, NE (US); Fred C. Casto, Omaha, NE (US); Kenneth Algiene, Littleton, CO (US)

(73) Assignee: First Data Corporation, Greenwood Village, CO (US)

(*) Notice: Subject to any disclaimer, the term of this patent is extended or adjusted under 35 U.S.C. 154(b) by 0 days.

(21) Appl. No.: 10/122,636

(22) Filed: Apr. 15, 2002

(65) Prior Publication Data

US 2003/0038439 A1 Feb. 27, 2003

Related U.S. Application Data

(63) Continuation-in-part of application No. 09/476,077, filed on Dec. 30, 1999, now Pat. No. 6,390,759.

(51) Int. Cl.$^7$ ................................................. B62B 3/08
(52) U.S. Cl. ..................... 280/79.11; 280/79.4; 211/20; 414/430; 414/346; 414/469; 414/743
(58) Field of Search .......................... 280/79.4, 79.11, 280/402, 33.996, 33.997; 211/17, 20, 21, 22, 23, 24; 414/426, 427, 428, 429, 430, 343, 346, 469, 743; D34/23, 26; D12/94

(56) References Cited

U.S. PATENT DOCUMENTS

| | | | |
|---|---|---|---|
| 708,346 A | 9/1902 | Grondin et al. | |
| 1,536,611 A | 5/1925 | Duke | |
| 1,789,391 A | 1/1931 | Roe | |
| 2,189,019 A | 2/1940 | Lewis | |
| 2,254,564 A | 9/1941 | Caslake | |
| 2,463,744 A | * 3/1949 | Clemens | 414/537 |
| 2,472,952 A | * 6/1949 | Lennard | 280/35 |
| 2,569,050 A | * 9/1951 | Gref et al. | 414/480 |
| 2,943,863 A | * 7/1960 | Corey et al. | 280/79.11 |
| 2,971,769 A | * 2/1961 | Gaddis | 280/79.11 |
| 3,066,946 A | * 12/1962 | Nelson | 280/79.11 |
| 3,111,915 A | 11/1963 | Gray | |
| 3,224,612 A | 12/1965 | Olson | |
| 3,285,447 A | 11/1966 | Junion | |
| 3,495,850 A | 2/1970 | Ziskal | |
| 3,879,053 A | 4/1975 | Chvala | |
| 3,897,959 A | 8/1975 | Haffner | |
| 4,040,521 A | * 8/1977 | Fitzpatrick | 211/24 |
| 4,067,265 A | 1/1978 | Watson | |
| 4,125,269 A | 11/1978 | Kiel | |
| 4,240,773 A | 12/1980 | Terry | |
| 4,318,571 A | 3/1982 | Vize | |
| 4,327,933 A | * 5/1982 | Tuggle | 280/414.2 |
| 4,582,178 A | 4/1986 | Huneault | |
| 4,593,883 A | 6/1986 | Nelson | |
| 4,655,466 A | 4/1987 | Hanaoka | |
| 4,690,605 A | * 9/1987 | Coccaro | 414/429 |
| 4,784,402 A | * 11/1988 | Roman | 280/79.4 |
| 4,801,152 A | * 1/1989 | Elliott et al. | 280/47.34 |
| 4,895,319 A | * 1/1990 | Bardsen et al. | 244/115 |
| 4,913,459 A | * 4/1990 | Smeitink | 280/641 |
| 4,934,720 A | * 6/1990 | Dobron | 280/79.11 |
| 5,035,445 A | 7/1991 | Poulin | |
| 5,046,748 A | 9/1991 | Oat-Judge | |
| 5,049,025 A | * 9/1991 | Roman | 414/429 |

(List continued on next page.)

Primary Examiner—Christopher P. Ellis
Assistant Examiner—Brian Swenson
(74) Attorney, Agent, or Firm—Morris, Manning & Martin LLP (57) ABSTRACT

An improved dolly system including at least three dollies adjustably interconnected as a system to allow a trailer or other vehicle to be loaded therein. The dollies are adjusted for the width and the length of the trailer to mate the dollies with the wheels of the trailer. Four dollies can be adjustably connected in a system to provide a vehicle dolly system. The system can include one or more brakes and once loaded the system can be moved in any direction to facilitate the maximum use of available parking space.

11 Claims, 9 Drawing Sheets

U.S. PATENT DOCUMENTS

| | | | |
|---|---|---|---|
| 5,052,703 A * | 10/1991 | Bertrand | 280/47.34 |
| 5,052,877 A | 10/1991 | Jaaskelainen et al. | |
| 5,253,972 A | 10/1993 | Drew et al. | |
| 5,413,449 A | 5/1995 | Schoenherr et al. | |
| 5,452,909 A * | 9/1995 | Zinski | 280/79.4 |
| 5,464,076 A | 11/1995 | Benedetto, Jr. | |
| 5,544,719 A | 8/1996 | Boriani et al. | |
| 5,618,152 A | 4/1997 | Andrews | |
| 5,709,520 A * | 1/1998 | Pish | 414/427 |
| 5,732,960 A * | 3/1998 | Elam | 280/79.4 |
| 5,893,571 A * | 4/1999 | Nowell | 280/43 |
| 6,010,296 A | 1/2000 | Enders | |
| 6,098,761 A | 8/2000 | Kooima et al. | |
| 6,179,542 B1 * | 1/2001 | Haven | 414/428 |
| 6,390,759 B1 | 5/2002 | Novak et al. | |

* cited by examiner

DOLLY SYSTEM FOR VEHICLE MOVEMENT

CROSS-REFERENCE TO RELATED APPLICATION

This application is a continuation-in-part and claims the benefit under 35 U.S.C. §120 to the filing date of U.S. patent application Ser. No. 09/476,077, titled "Integrated Brake/Tilt-Release Mechanism for a Dolly with a Pivoting Carriage," filed Dec. 30, 1999, now U.S. Pat. No. 6,390,759, which is incorporated by reference herein.

TECHNICAL FIELD

The invention relates generally to devices for moving large, heavy objects, and more specifically, to a system for moving vehicles to any desired location in any direction.

BACKGROUND OF THE INVENTION

Numerous attempts have been made, including that disclosed in the parent application, Ser. No. 09/476,077, to lift or lift and move large objects, such as with jacks or dollies. Such objects can be large rolls of paper as in the parent application.

Printers used in industrial and commercial applications, such as in paper mills and warehouses, often use a large paper roll having a hollow core as a starting material to print high volumes of letters and forms. These paper rolls are typically over three feet in diameter, and each one can weigh several hundred pounds or more. It is difficult, if not impossible, for an individual to move a roll of paper of this size without the use of powered machinery and without damaging the paper.

Large rolls of paper are usually handled or transported in a vertical position with the aid of the ordinary two-wheeled factory truck or by simply rolling the roll across the floor. Handling rolls of paper in this manner can cause considerable damage to the exposed paper along the outer surface of the roll, especially the outer edges of the roll. Because of the damage to the end of the roll, it is often necessary to cut off and throw away the outer layers of the paper. Sometimes the damage to a roll of paper is so great that a significant part of the roll is rendered entirely unfit for its intended use, resulting in a substantial loss of money and resources. No satisfactory means for allowing an individual to handle a single roll of paper has been available. It would be desirable to provide a convenient means and a method of handling and transporting a large roll of paper from a pallet to a desired location in a less cumbersome manner without requiring lifting of the roll or allowing the roll to contact the floor.

Attempts have been made to provide a device to facilitate the handling and transporting of large rolls of paper. U.S. Pat. No. 1,536,611 describes a truck skid for handling large rolls of paper. The truck skid provides a skid or an incline onto which a roll of paper must be moved in order to load the roll on the truck skid. Rolling the paper up the skid or incline requires a significant amount of physical effort by an individual. Furthermore, the truck skid is not configured to receive a roll of paper from a raised surface such as a pallet without raising or lowering the roll. Several of the truck skids described in U.S. Pat. No. 1,536,611 cannot be stacked on top of each other or otherwise arranged to save space when not in use and it would be inefficient and expensive to store and provide an inventory of several of the truck skids loaded with paper.

The dolly described in the parent application provides a solution for transporting the large rolls of paper. Similar problems are presented when it is desired to move a vehicle, such as in a parking lot, in a variety of directions. There is a need for a system, which will allow the vehicle to be moved in any desired direction, such as sideways to closely fit the vehicles in a space. It also would be desirable to be able to move the vehicle without the ignition key. Thus, the vehicle occupant could park the vehicle on the system and the parking attendant or attendants easily can move the vehicle in any direction, as desired, to minimize the required parking space.

SUMMARY OF THE INVENTION

The present invention provides an improved dolly system for moving vehicles in any desired location. At least three dollies can be adjustably interconnected as a system to allow a trailer or other vehicle to be loaded thereon. The dollies are adjusted for the width and the length of the trailer to align the dollies with the wheels of the trailer. Four dollies can be adjustably connected in a system to provide a four-wheel vehicle dolly system. The dollies can be identical to one another. The system can include one or more brakes and once loaded the system can be moved in any direction to facilitate the maximum use of available parking space.

The various aspects of the present invention may be more clearly understood and appreciated from a review of the following detailed description of the disclosed embodiments and by reference to the appended drawings and claims.

BRIEF DESCRIPTION OF THE DRAWINGS

FIGS. 1–6 illustrate embodiments of the parent application.

FIGS. 7–10 illustrate embodiments of the present invention.

DETAILED DESCRIPTION OF THE INVENTION

The parent application, U.S. patent application Ser. No. 09/476,077, is described in the following description of FIGS. 1–6.

An exemplary embodiment of the parent application is an improved roll cart device that can be used for moving a large roll of paper from a pallet in a warehouse to a printer at another location. These large rolls of paper can be over fifty inches in diameter and weigh over one half of a ton.

Furthermore, these rolls of paper are top heavy and are often difficult to move manually without damaging the outer layers of paper. The outside of a roll of paper is often damaged during moving, particularly when rolled on the floor. The damaged paper must be removed from the roll and becomes waste. The improved roll cart of the parent application provides a safe and efficient method of moving a roll of paper easily while minimizing damage to the paper. The device includes a pivoting carriage that stabilizes a large roll of paper and permits easy loading and unloading of the roll. The carriage is pivotally attached to a frame so that the carriage can tilt and allow a roll of paper to be rolled onto or off of the carriage without lifting the roll. The carriage also includes two inclined surfaces, stops or other projections, one at each end of the carriage, to stabilize the paper roll. The pivot point is strategically placed on the carriage so that the carriage normally rests on the frame in a gravitationally stable and substantially horizontal resting position. From this position, the carriage can tilt or pivot to a gravitationally unstable position by applying force or weight to the leading edge of the carriage. In this tilted position, the inclined surface, stop or other projection pivots to a level below or flush with the top surface of the roll cart, so that a roll of paper can be loaded onto the carriage with lifting the roll of paper over the inclined surface, stop or projection. This tilting feature minimizes damage to the outside of the roll of paper and minimizes the amount of effort required to load and unload the roll of paper on to and off of the roll cart.

The device can be securely maintained stationary with respect to a surface by engaging a brake. When the brake is engaged, rolling of the cart is impeded and the carriage pivots freely to allow loading or unloading of a roll by rolling the roll on to or off of the carriage. When the brake is disengaged, a locking mechanism engages the carriage to prevent the carriage from tilting. When the brake is disengaged, the cart is free to roll but the carriage is restricted from tilting or otherwise pivoting by the locking portion of the mechanism. This combination braking/locking feature not only prevents the carriage from pivoting when the device is rolling, it also prevents inadvertent unloading of a roll and facilitates the safe transportation of large heavy rolls of paper. The roll cart can also be used for moving other objects, particularly large objects of similar shape such as spools and rolls of other materials. The parent application also provides a method for moving a roll of paper from one raised surface to another raised surface that involves rolling the cart to a first raised surface upon which a roll of paper is located, engaging the brake portion of the combination braking/locking mechanism, rolling the roll of paper from the first raised surface on to one end of the cart, tipping the carriage by further rolling the roll of paper over the leading edge of the carriage and onto the carriage, and then pivoting the carriage back to a stable position. The braking portion of the combination braking/locking mechanism can then be disengaged, engaging the locking portion of the combination braking/locking mechanism and preventing the carriage from pivoting. The cart is then loaded with a roll of paper and can be safely maneuvered and rolled to a desired location. To unload the roll of paper, the brake is engaged, the lock is disengaged and the roll of paper can be rolled off the carriage and, desirably, on to another raised surface.

Turning now to the drawings, in which like numerals reference like elements throughout the several figures, an exemplary embodiment for implementing the parent application is described in FIGS. 1 through 6.

Figure 1:
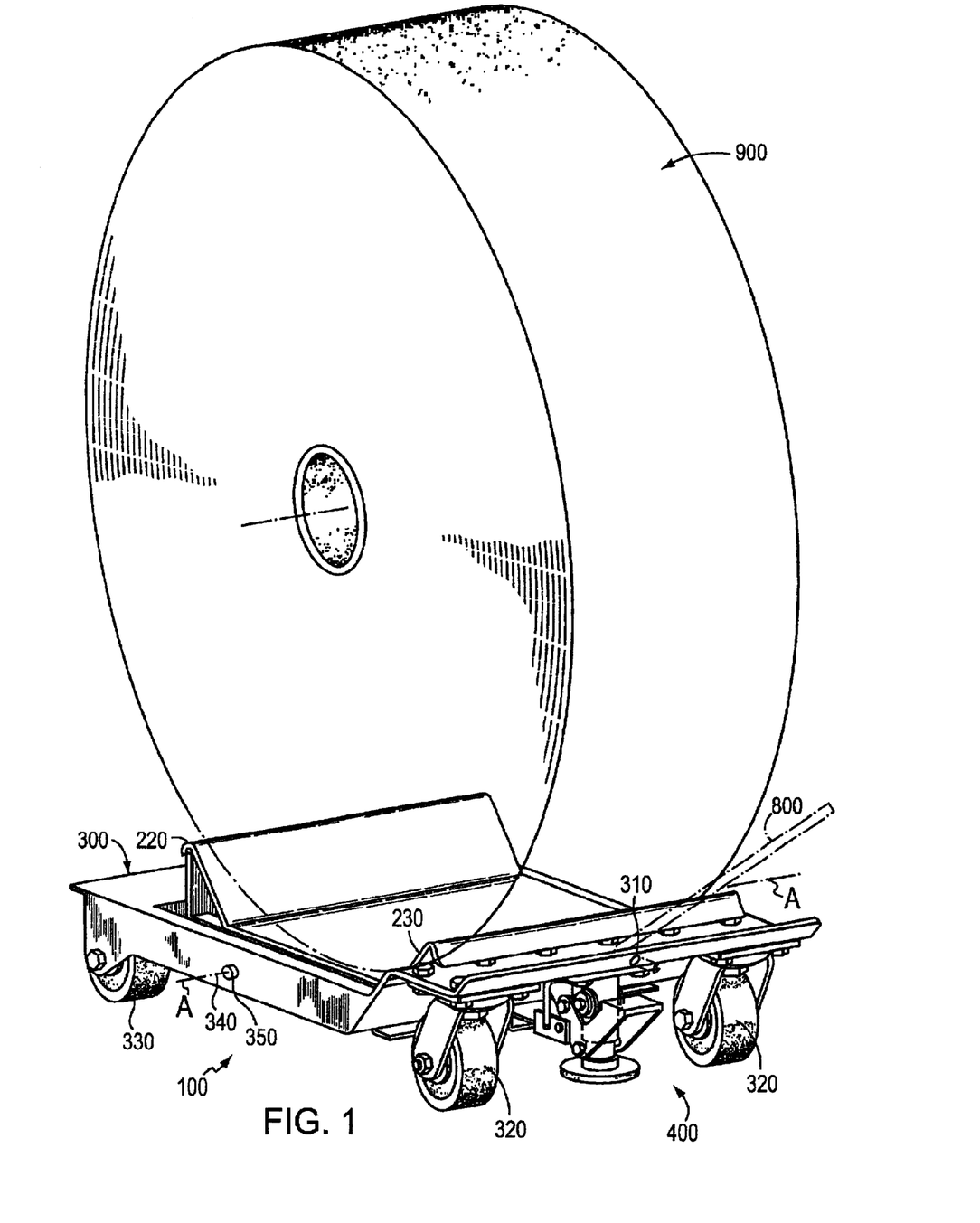
FIG. 1 is a perspective view of an exemplary embodiment of a roll cart according to the parent application.
Figure 2:
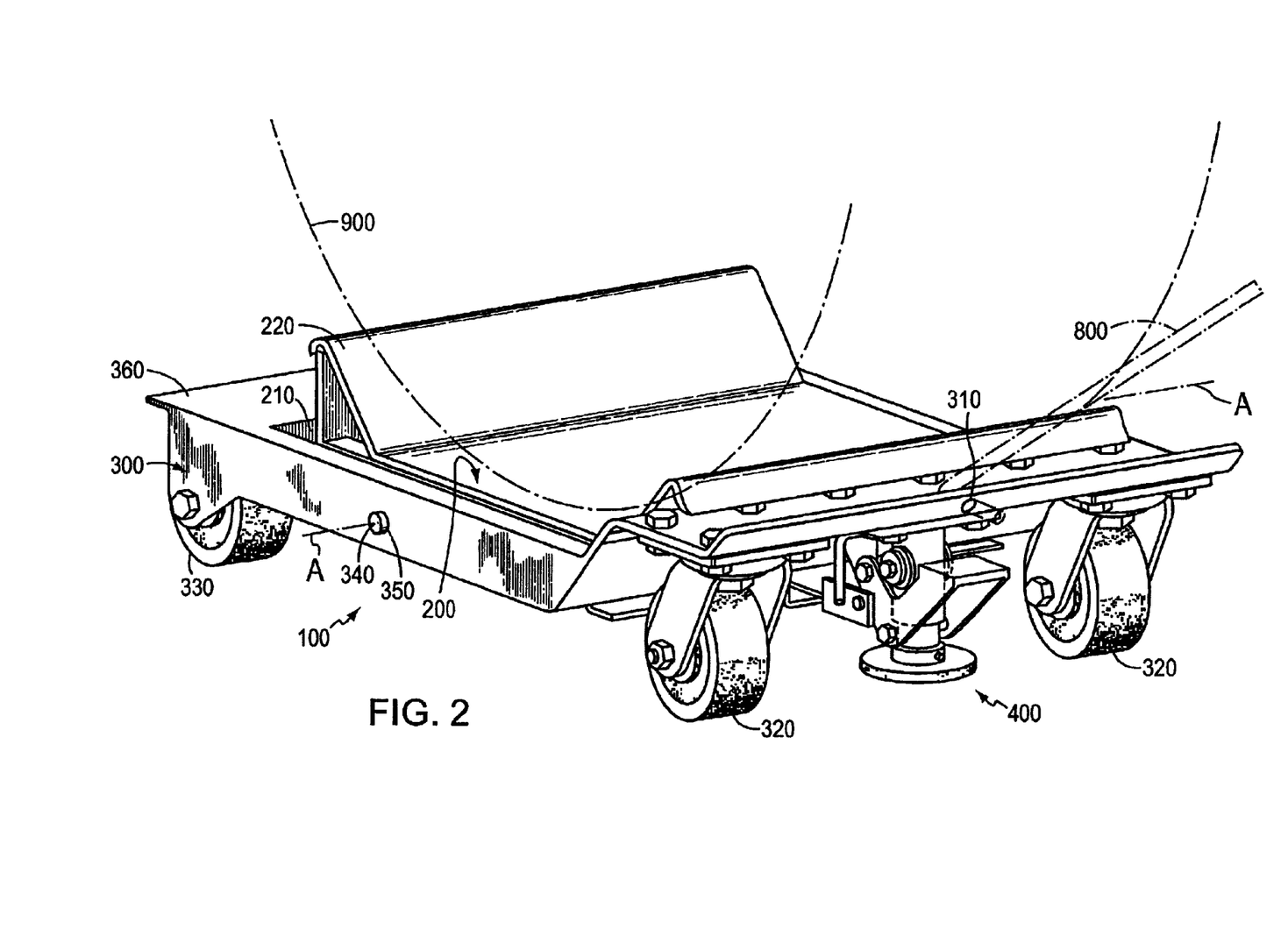
FIG. 2 is an enlarged perspective view of the roll cart of FIG. 1.

FIGS. 1 through 6 show an exemplary device, or roll cart 100 illustrating the parent application. Turning now to FIG. 1, the device 100 is shown in perspective, loaded with a large roll of paper 900. The large roll of paper 900 can be used to print a large number of documents without having to change rolls frequently. Advantageously, several of the devices 100 of the illustrated embodiment can be loaded with paper and lined up next to each other in a printing room to provide a ready inventory of paper for printing. In FIGS. 1 and 2, the device 100 is also shown with a partially illustrated means for pulling 800 the device, or roll cart 100, inserted through a hole 310 in the device 100. The means for pulling 800 can be any device that can be used to push or pull the roll cart 100 and includes, but is not limited to, a removable hook, a T-grip and other similar devices (not illustrated). In a preferred embodiment, the hole 310 is provided in the device 100 so that the means for pulling 800 can be inserted through the hole 310 and used by an individual (not illustrated) to pull the device 100 to a desired location. The means for pulling 800 is typically used when the device 100 is empty so that an individual can pull an empty cart without having to bend down. A roll cart 100 that is loaded with the paper roll can be pushed and maneuvered to a desired location by pushing on the roll that is loaded on the roll cart 100. A second hole (not illustrated) can be provided at the end of the cart opposite the end on which the first hole 310 is provided, so that more than one roll cart 100 can be linked together and pulled in a train-like fashion.

Figure 3A:
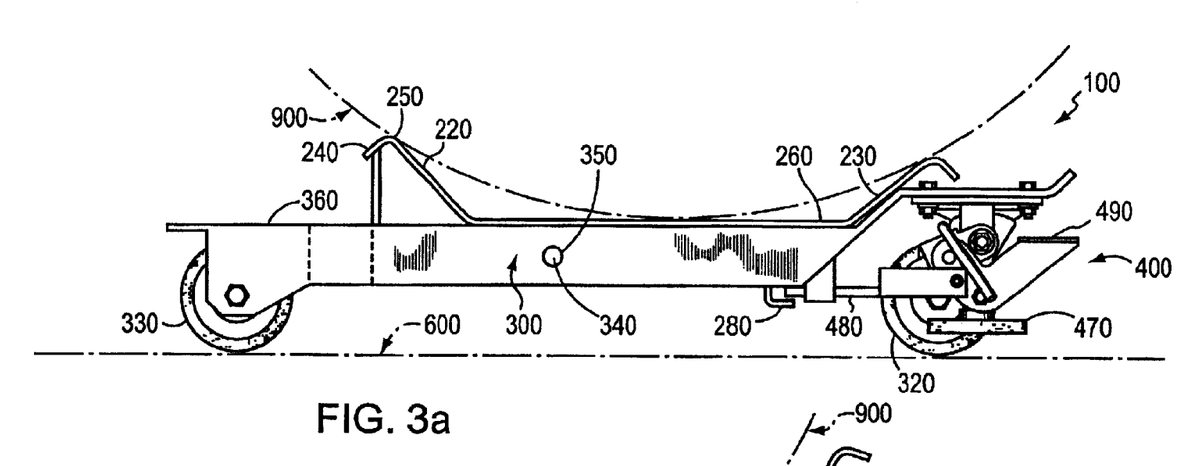
FIG. 3a is a side view of the roll cart of FIG. 1.

The roll of paper 900 is shown resting on a carriage 200 that is supported on a rolling frame 300. Although, the frame 300 is shown to be rectangular-shaped in the Figures, it can be any shape that allows the device to have the features that will be described. The device 100 includes means for allowing the device to travel or roll across a surface 600 (FIG. 3*a*). In the illustrated embodiment, the means for allowing the device 100 to travel or roll across a surface includes two pairs of wheels 320 and 330. However, the means for allowing the device 100 to roll or otherwise travel across the surface 600 includes any means used to facilitate the movement of an object over a surface and includes, but is not limited to, wheels, casters, tracks, rollers, bearings and the like (not illustrated). In the illustrated exemplary embodiment, the frame 300 rests on the first pair of wheels 320 that freely rotate to allow for steering of the device 100 and a second pair of wheels 330 that is stationary, much like on a conventional shopping cart. In this desirable embodiment, the wheels 320 pivot about a vertical axis and are used for steering the device 100. It is also desirable to provide the means for pulling 800 the device 100 and the hole 310 at the end of the device having the steerable wheels 320.

Figure 3B:
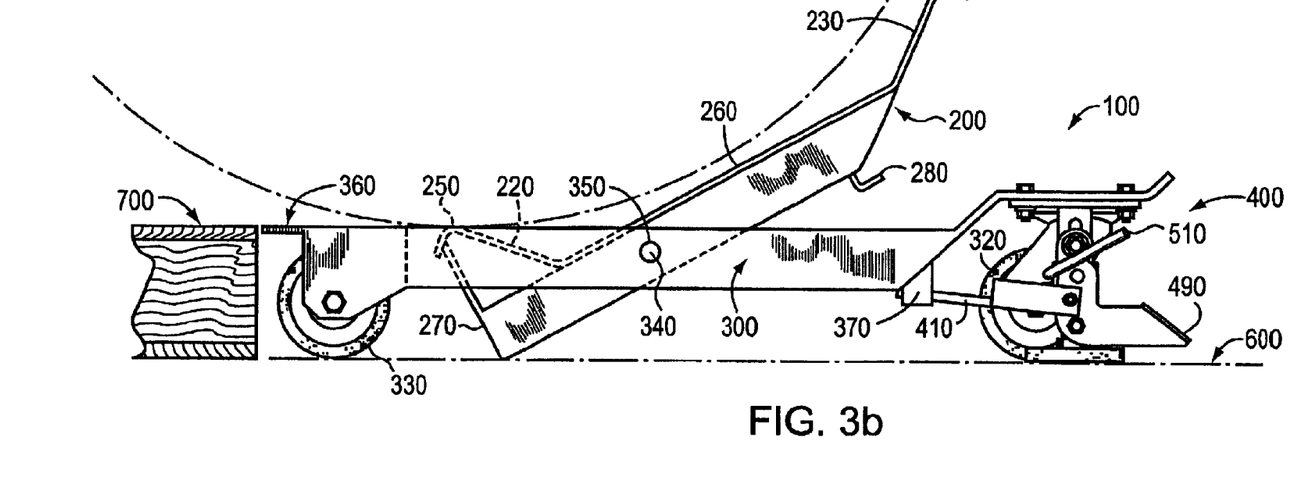
FIG. 3b is a side view of the roll cart of FIG. 1.

In the illustrated embodiment, the frame 300 is a one-piece heavy gauge steel chassis that includes a central, rectangular opening 210 in which a carriage 200 is fitted. As shown in FIGS. 2 and 3*a–b*, the carriage 200 includes a first inclined surface 220 at one end of the carriage and a second inclined surface 230 at the other end of the carriage 200. The inclined surface 220 includes an opposing inclined surface 240 that faces away from the center of the carriage 200 and toward the end of the carriage. The inclined surface 240 acts a leading edge and includes a top 250. The carriage 200 is designed to support and stabilize the large roll of paper 900 and is pivotally attached to the frame 300 so that the carriage can pivot about a horizontal axis, A-A at a point 340. The carriage 200 is attached to the frame 300 by a means for pivotally attaching the carriage 200 to the frame 300. The means for pivotally attaching the carriage 200 to the frame 300 can be an axle, a pair of bolts, a pair of pins or other like device or devices 350 that are used to pivotally attach one item to another item. In a particularly desirable embodiment, the carriage 200 is pivotally attached to the frame 300 at the point 340 proximate the first inclined surface 220 of the carriage 200, so that the carriage 200 is pivotal horizontally about axis A-A. The carriage 200 normally rests on the frame 300 in a gravitationally stable and substantially horizontal position as illustrated in FIG. 3a. When the weight of the roll of paper 900 is applied to the end of the carriage proximate the inclined surface 240, the weight of the roll 900 pivots or tilts the carriage 200 to accept the roll 900 as illustrated in FIG. 3b. Desirably, a top surface of the frame 360 is about the same height as a standard pallet 700 so that a roll of paper 900 can be rolled directly off of the pallet 700 and onto the device 100 without raising or lowering the roll of paper 900. A standard pallet is typically about four and one-half inches in height. Therefore, it is desirable that the height from the bottom of the wheels 330 to the top surface 360 of the frame 300 is also about four and one-half inches. Thus, the roll of paper 900 can be rolled off the pallet 700, over the frame 300, over the top surface 360 and onto the carriage 200 as illustrated in FIG. 3b with minimal effort from the user. It is also desirable to design the height of the frame 300 so that the frame can roll over an OSHA approved ramp (not illustrated).

A key feature of the device 100 is that the carriage 200 pivots to accept the roll 900 and includes two inclined surfaces, stops or other projections 220 and 230, one at each end of the carriage, to stabilize the large diameter roll of paper 900. Desirably, the inclined surfaces 220 and 230 and a generally flat surface 260 of the carriage 200 there between, are arranged so that the roll of paper 900 contacts all three surfaces 220, 230 and 260 and is stabilized by or cradled by the three surfaces as illustrated in FIG. 3a.

In yet another desirable embodiment, the carriage 200 includes a downward extending portion 270 that contacts the floor 600, also illustrated in FIG. 3b, and prevents the carriage 200 from tilting so far that the roll of paper 900 would fall down into the carriage 200. The length of the downwardly extending portion 270 or the thickness of the carriage 200 is desirably selected so that carriage 200 pivots enough for the top 250 of the inclined surface 220 to be approximately flush with or just below the top surface 360 but does not pivot so far that the top 250 of the inclined surface 220 is substantially lower than the top surface 360 of frame 300. In the tilted, unstable position, the roll of paper 900 can be easily and smoothly rolled on to or off of the carriage 200 without a significant change in height, without lifting or lowering the roll of paper 900 and without damaging the outside of the roll of paper.

Figure 4:
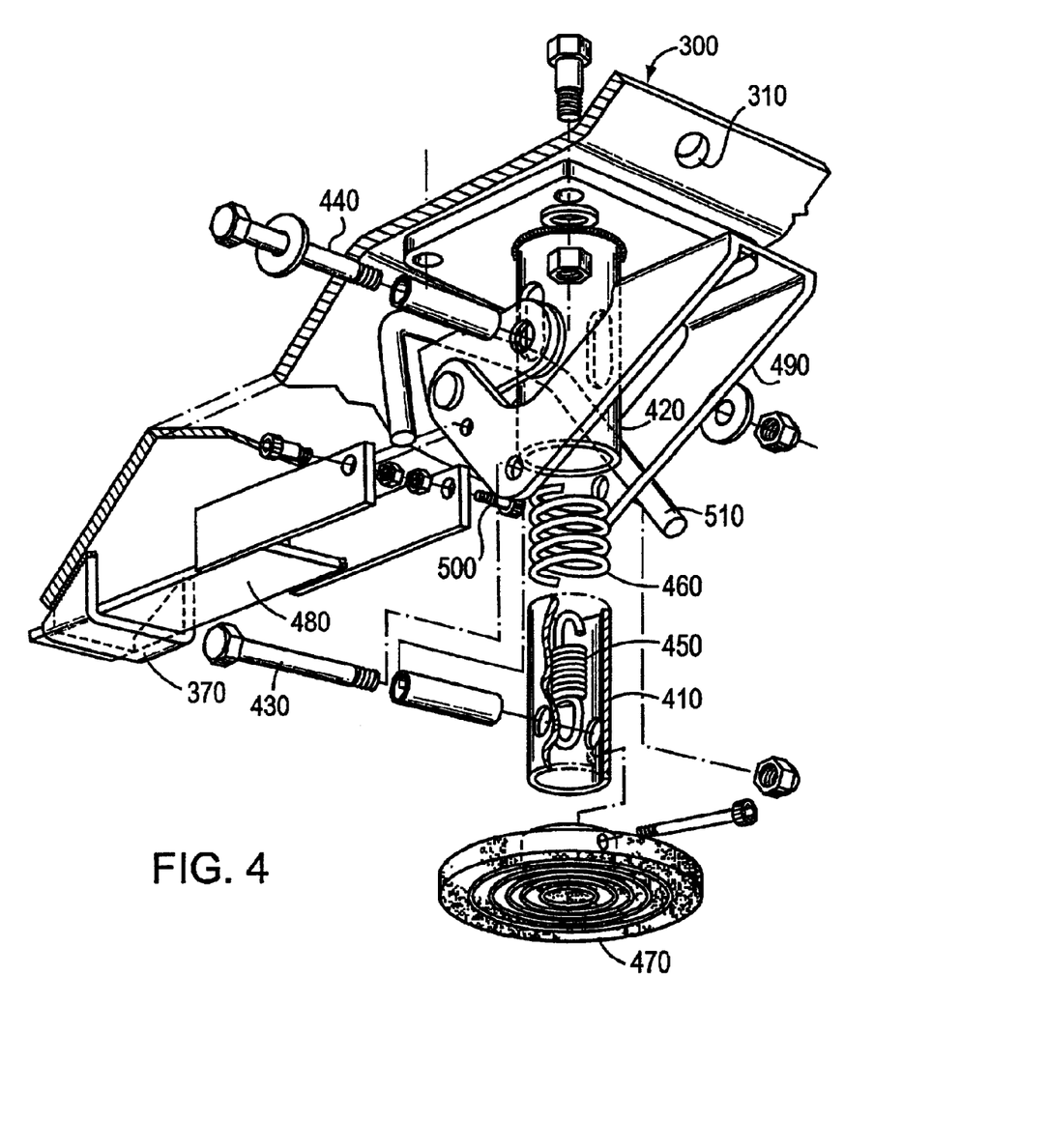
FIG. 4 is a detailed, exploded view of an exemplary combination braking/locking mechanism of the parent application.
Figure 5:
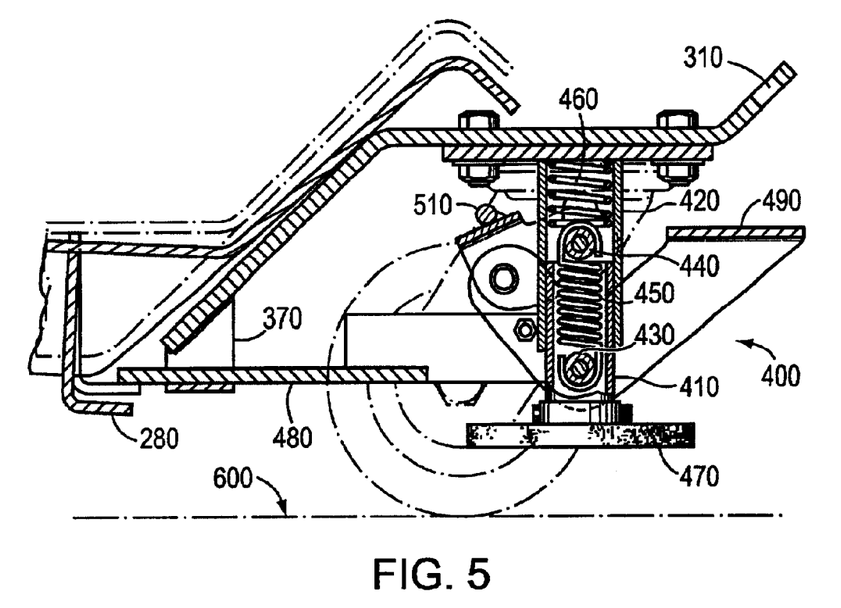
FIG. 5 is an enlarged, fragmentary section of the combination braking/locking mechanism of FIG. 4.
Figure 6:
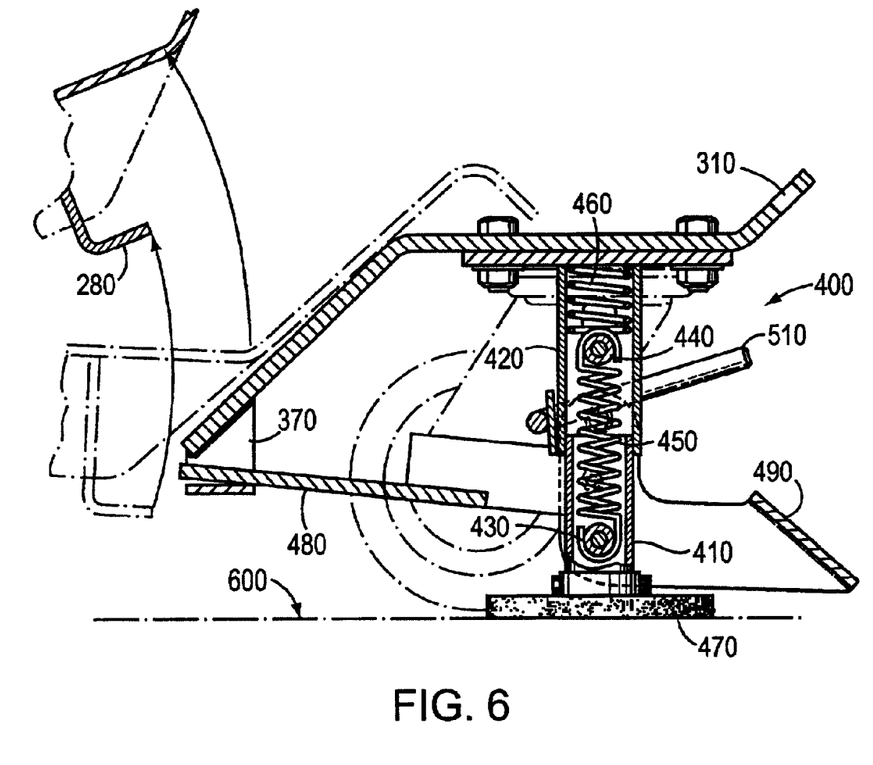
FIG. 6 is an enlarged, fragmentary section of the combination braking/locking mechanism of FIG. 4.

Another key feature of the parent application invention is a combination braking/locking mechanism 400, an exemplary embodiment of which is illustrated in detail in FIGS. 4, 5 and 6. FIG. 4 is a detailed exploded view illustrating the individual components of the exemplary combination braking/locking mechanism 400 of the Parent Application. The combination braking/locking mechanism 400 includes both means for restricting movement of the device 100 across a surface and means for restricting the tilting or otherwise pivoting of the carriage 200 relative to the frame 300 that function in an alternative manner. Desirably, the combination braking/locking mechanism 400 also includes separate means engaging the brake and for disengaging the brake. FIG. 5 is an enlarged fragmentary section of the combination braking/locking mechanism 400 illustrating the locking portion of the mechanism in the engaged position and the brake portion of the mechanism in the up, disengaged, position. In the position illustrated in FIG. 5, the device 100 can roll freely across the surface 600 but the carriage 200 is restricted from pivoting or tilting by a locking mechanism and is in a gravitationally stable, substantially horizontal position. FIG. 6 is a similar enlarged fragmentary section of the combination braking/locking mechanism 400 illustrating the locking portion of the mechanism in the disengaged position and the brake portion of the mechanism in the down, engaged, position. In the position illustrated in FIG. 6, the carriage 200 is free to pivot or tilt but the device 100 is restricted from rolling across the surface 600 by the brake portion of the mechanism.

The combination braking/locking mechanism 400 of the illustrated, exemplary embodiment is a modified 4-inch floor brake assembly for a hand truck, model no. 66027756098 that was purchased from MSC. The brake assembly includes two inter-fitting, telescoping cylinders 410 and 420 connected to each other with bolts or pins 430 and 440 and springs 450 and 460 so that one cylinder can move within the other cylinder. To the lowermost cylinder 410 is attached a brake pad 470 for contacting the floor surface 600 and restricting movement of the device 100. Although the braking/locking mechanism 400 is illustrated as working in an alternating fashion where in only one engages at any one time, it may be desirable to provide a roll cart 100 in which a brake and a lock may be engaged simultaneously to provide a stationary cart 100 that is loaded with the roll 900 that is in a stable locked position.

The brake assembly was modified by adding a locking bar 480 to engage a portion 280 of the carriage 200 and prevent the carriage 200 from pivoting. In the exemplary embodiment illustrated, the portion 280 of the carriage is an L-shaped extension extending from the underside of the carriage 200 that the locking bar 480 can extend into to prevent the carriage 200 from pivoting or otherwise tilting. However, the portion 280 of the carriage can be of other configurations including, but not limited to, a U-shaped extension, a slot or a hole into which the locking portion of the combination braking/locking mechanism 400 can extend or otherwise engage (not illustrated). The locking bar 480 is connected to a pedal 490 by a bolt 500. The pedal 490 is attached to the brake pad 470 and can be depressed to lower the brake pad 410 to the surface 600 and to also simultaneously pull the locking bar 480 away from or otherwise disengage the locking bar 480 from the carriage 200 so that the carriage can tilt. The brake assembly 400 also includes a lever 510 for raising the brake pad 470 from the down, brake engaged position while simultaneously engaging the locking bar 480 with the portion 280 of the carriage 200. In yet another desirable embodiment, the frame 300 further includes a guide 370 that supports and accurately guides the locking bar 480 into the portion 280 of the carriage.

Although the parent application embodiment has been described as including the combination braking/locking mechanism 400 (i.e. a braking mechanism that works in cooperation with a locking mechanism), it will be understood that the device 100 can be modified so that the braking mechanism 400 and the locking mechanism act independently and can be separately engaged or disengaged. FIGS. 3a and 3b illustrate the cooperation of the tilting of the carriage 200 for loading or unloading of the paper roll 900 and the operation of the combination/locking brake mechanism 400. As described above, the carriage 200 can tilt to facilitate the loading and unloading of the roll 900 on to and off of the carriage, 200 and, ultimately, the device 100. FIG. 3a is side view of the device of FIG. 1 loaded with the roll of paper 900, with the brake disengaged and with the carriage 200 in a locked position. FIG. 3b is a similar side view of the device of FIG. 1 but with the brake disengaged and with the carriage 200 in a tilted position. The height of the frame 300 can be configured to receive the roll 900 from the conventional pallet 700, as shown in FIG. 3b. Because the rolls of paper 900 are typically shipped on pallets, the device 100 enables an individual to handle and transport the roll of paper 900 without lifting or otherwise raising or lowering the roll of paper 900. Advantageously, the device 100 when loaded with the roll of paper 900 has a low center of gravity. More advantageously, several of the loaded devices 100 can be lined up to provide a ready inventory of paper and several empty devices can be vertically stacked upon one another when not in use to save storage space. Particularly, in the exemplary embodiment illustrated in the Figures, the devices 100 are configured so that one device can be stacked on top of another similar device by laying the wheels on one end of the second device on the top of the opposed end of the first device. In this manner, more than one similar device can be stacked vertically in the same floor space required for one such device.

The parent application also provides a method for moving a roll of paper from one raised surface, such as a pallet upon which such rolls are delivered, to another raised surface, such as a printer or an unwinding device on a printer. The method involves rolling the device 100 to a first raised surface upon which a roll of paper is located, e.g. a pallet, engaging the brake portion of the combination braking/locking mechanism 400, rolling a roll of paper from the pallet onto one end of the device, tipping the carriage 200 from a stable, substantially horizontal position to a tilted position by further rolling the roll of paper over the leading edge of the carriage, further rolling the roll of paper onto the carriage and pivoting the carriage back to the stable position, then disengaging the braking portion of the combination braking/locking mechanism and engaging the locking portion of the combination braking/locking mechanism that prevents the carriage from pivoting. The device is then safely loaded with a roll or paper and can easily be handled and maneuvered by an individual. The method may also include the use of a means for pulling the device, including but not limited to, a T-grip, a hook, a leash or any other similar device that can be inserted into the hole 310 and used to pull or to push the device 100. Several devices loaded in such a manner can be lined up in small area near the area the paper will be needed to provide a ready inventory of paper. Such inventorying can be used to minimize down time between changing rolls of paper on a printer.

The device 100 is unloaded by rolling the device to a second raised surface upon which the roll of paper is to be unloaded, engaging the brake portion of the combination braking/locking mechanism 400, tipping the carriage 200 from the stable position by rolling the roll of paper 900 over one of the projections, stops or raised surfaces on the surface of the carriage, and rolling the roll of paper off of the carriage and onto the second raised surface upon which the roll of paper is to be unloaded. The braking portion of the combination braking/locking mechanism can now be safely disengaged and the device rolled away from the raised surface upon which the roll of paper was unloaded. The empty device can be stacked vertically upon one or more similarly shaped devices with the wheels of the top device lying over the opposing wheels and on the surface of the lower device.

Referring now to FIGS. 7–10, the embodiments of the present invention are illustrated. A first dolly system embodiment of the present invention is designed generally by numeral 1000 in FIG. 7. The dolly system 1000 includes three separate, preferably dollies 1012 and 1014 are spaced apart by an adjustable member, such as a cross bar, rod or pipe 1016. The member 1016 is adjusted to provide the desired distance or width between the dollies 1012 and 1014 to accommodate a rear hitch on a boat or other type of three-wheel trailer (not illustrated).

Figure 7:
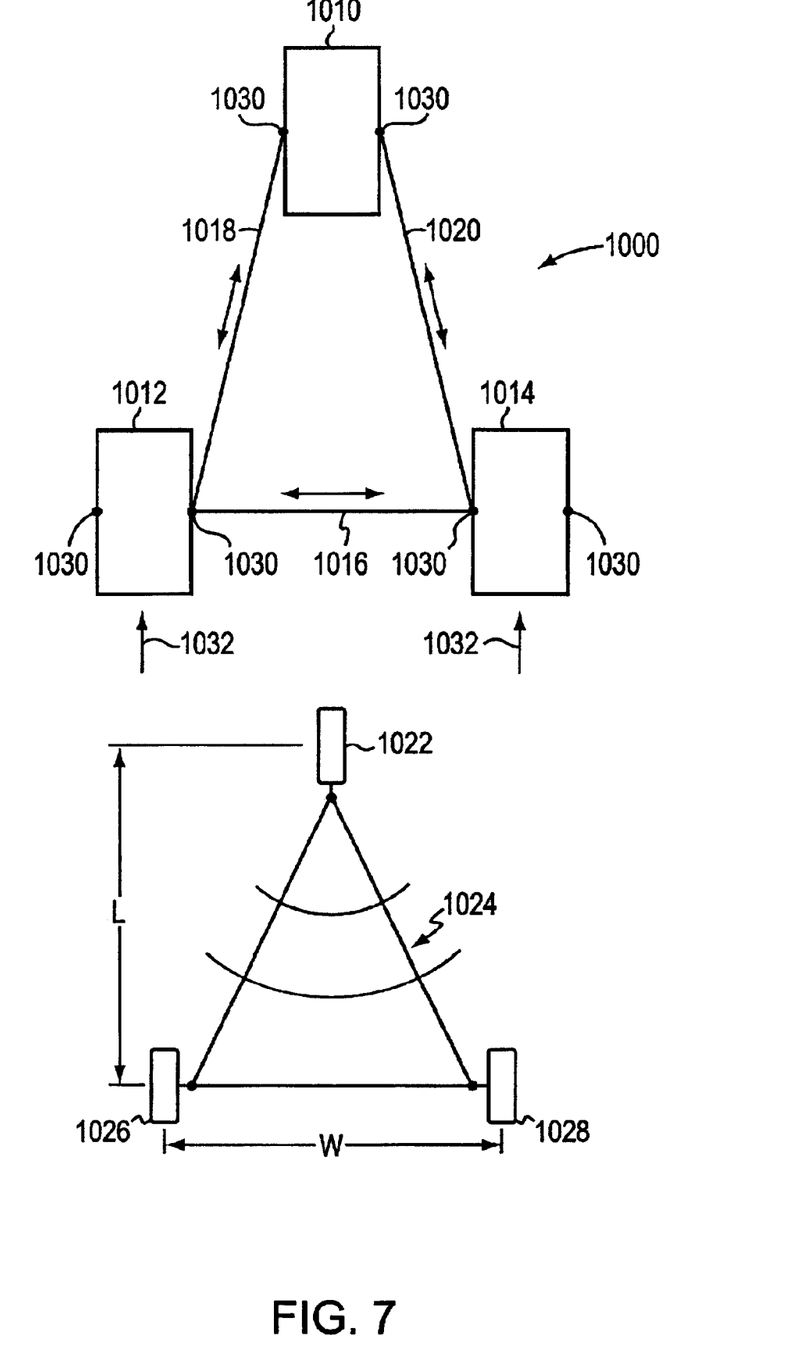
FIG. 7 illustrates a diagrammatic top plan view of a first three dolly system embodiment of the present invention.

In a like manner, the two rear dollies 1012 and 1014 are connected to the first dolly 1010 by respective adjustable bars, rods or pipes 1018 and 1020. The bars or members 1018 and 1020 also are adjusted to provide the desired length or distance between the first dolly 1010 and the rear pair of dollies 1012 and 1014, again to align with and accommodate various sized vehicles, as desired.

The members 1016, 1018 and 1020 can be any type of adjustable structures, such as bars, rods or pipes telescoping within one another and locked, for example by pins in a conventional manner (not illustrated). Further the members 1016 may be separable into two separate pieces to allow a front wheel 1022 or standard of a trailer 1024 (illustrated diagrammatically) to be passed there between (not illustrated).

In the same manner, the members 1018 and 1020 can be connected to the dolly 1010 at any location thereof, but preferably the members 1018 and 1020 are connected to the sides of the dolly 1010 (as illustrated). This will allow the front wheel 1022 or standard of the trailer 1024 to easily be placed onto the front dolly 1010.

The rear adjustable dollies 1012 and 1014 have been spread apart by the member 1016 at a distance to match the width (W) between a pair of rear trailer wheels 1026 and 1028. Although the trailer 1024 can be empty as illustrated, generally the trailer 1024 will be loaded with a boat (not illustrated). The adjustable members 1018 and 1020 also will be adjusted to match the distance or length (L) between the front trailer wheels 1022 and the rear pair of wheels 1026 and 1028.

By including connectors 1030 on the outsides of each of the dollies 1010, 1012 and 1014, the dollies 1010, 1012 and 1014 can be identical or substantially identical to one another. This also allows each of the dollies 1010, 1012 and 1014 to be utilized in any position of a three or four-wheel system, as illustrated in FIG. 8. The connectors 1030 can be any conventional type of connector, such as just a metal ring or slot. If it is desired to fix the relative positions of the dollies 1010, 1012 and 1014, then the connector 1030 can be of any type, which does not allow movement between the dollies with the members 1016, 1018 or 1020. In the single connection, such as the connectors 1030 being a metal ring, the members 1016, 1018 and 1020 can just include a hook or pin (not illustrated) for engaging the rings 1030.

In operation, the trailer 1024 will be positioned with the wheel or post 1022 adjacent the dolly 1010 and therefore the wheels 1026 and 1028 will be adjacent the respective dollies 1012 and 1014. The trailer 1024 is then moved onto the dolly system 1000, as illustrated by the arrows 1032. Once the trailer 1024 is loaded onto the system 1000, the trailer 1024 can be moved in any direction.

Figure 8A:
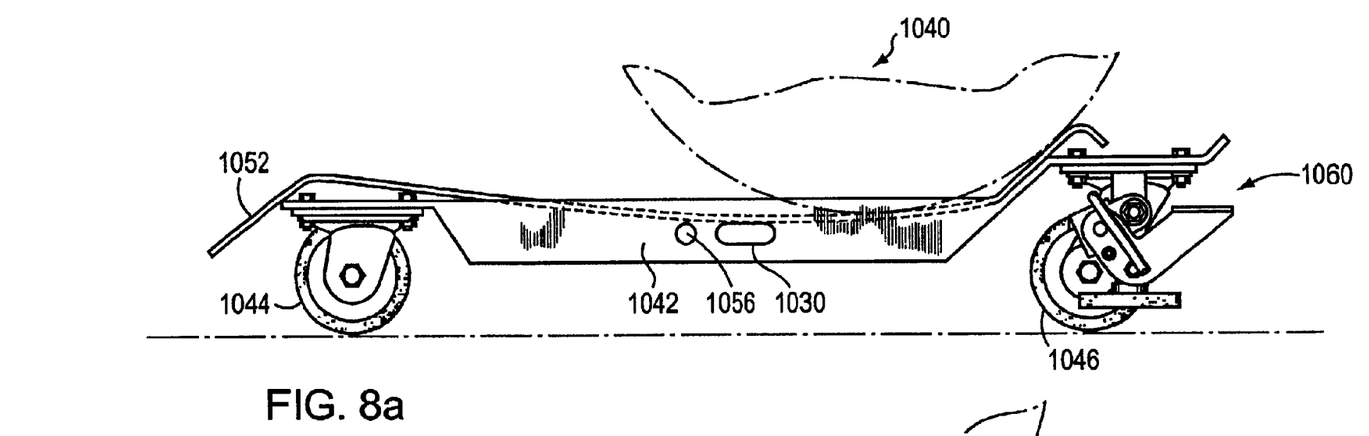
FIGS. 8a and 8b illustrate side plan views of a universal dolly for use in the dolly systems of the present invention.
Figure 8B:
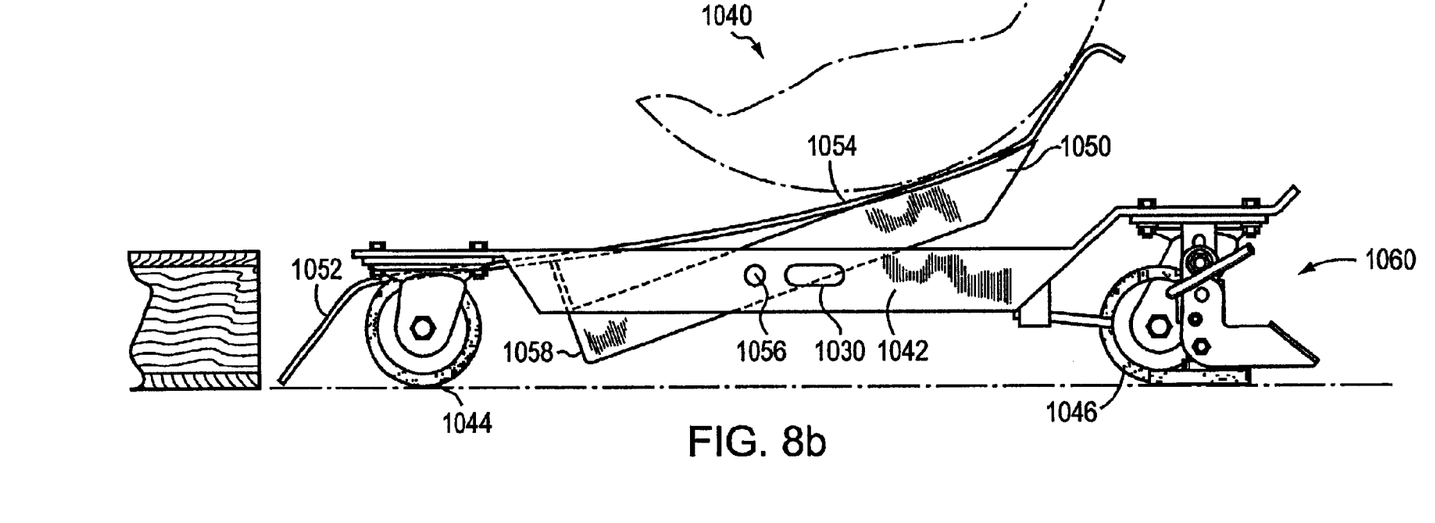
Figure 9:
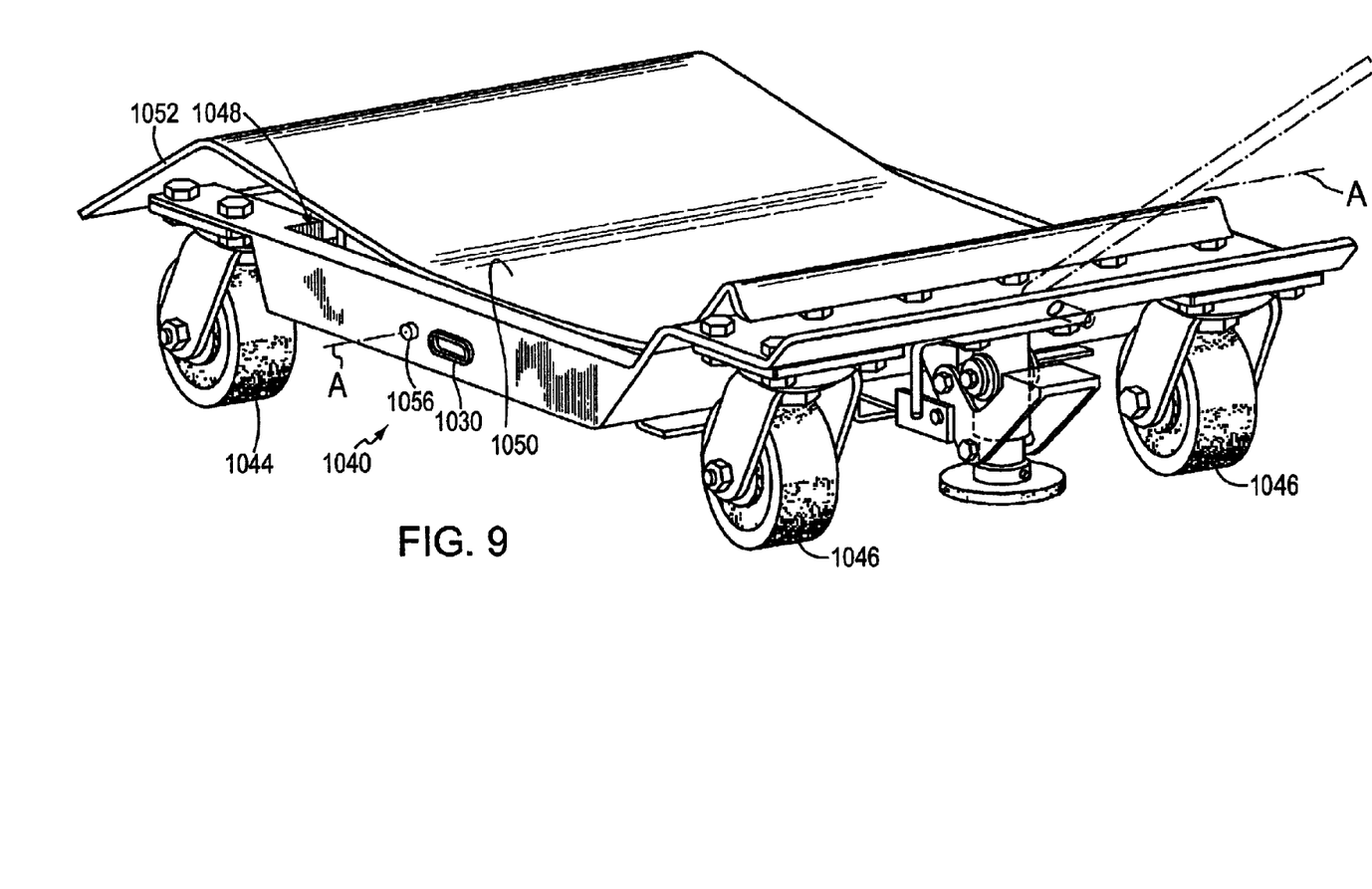
FIG. 9 is a perspective view of the dolly illustrated in FIGS. 8a and 8b.

One exemplary universal dolly embodiment 1040 is illustrated in FIGS. 8a and 8b. The dolly 1040 includes a frame 1042, similar to the frame 300. The frame 1042 is supported upon a first and second pair of freely rotating wheels 1044 and 1046 (only one of each pair being illustrated) like the wheels 320. Thus, unlike the frame 300 of the parent invention, which acts like a shopping cart with one fixed set of wheels, the dolly 1040 is free to move in any direction.

Although not required, the dolly 1040 also preferably includes a rectangular opening 1048 into which is fitted a pivoting carriage 1050, similar to the carriage 200. The frame 1042 however is lowered at the wheels 1048 to provide room for a ramp 1052 formed on the carriage 1050. The carriage 1050 also includes an arcuate or curved surface 1054 to accommodate the wheels of a vehicle, such as the wheels 1026, 1028 of the trailer 1024, when a vehicle is loaded on the system 1000.

Like the carriage 200, the carriage 1050 preferably is pivotally attached to the frame 1042 by a pair of pivot pins 1056. The carriage 1050 normally rests on the frame 1042 as illustrated in FIG. 8a. When desired, such as when loading or unloading a vehicle, the carriage 1050 can be tilted to ease the movement of the vehicle with or off of the carriage 1050. The carriage 1050 has a downwardly extending portion 1058 like the portion 270 of the parent invention to provide a solid base for the inclined position.

The dolly 1040 also preferably includes a braking mechanism 1058, like the mechanism 400. When the brake 1060 is engaged, as illustrated in FIG. 8b, then the dolly 1040 will not roll. When the dolly 1040 is one of the dollies in the system 1000, then at least one dolly brake 1058, but preferably two dolly brakes are engaged to stop the system from moving when located as desired or when loading or unloading a vehicle from the system 1000, to provide added stability.

Figure 10:
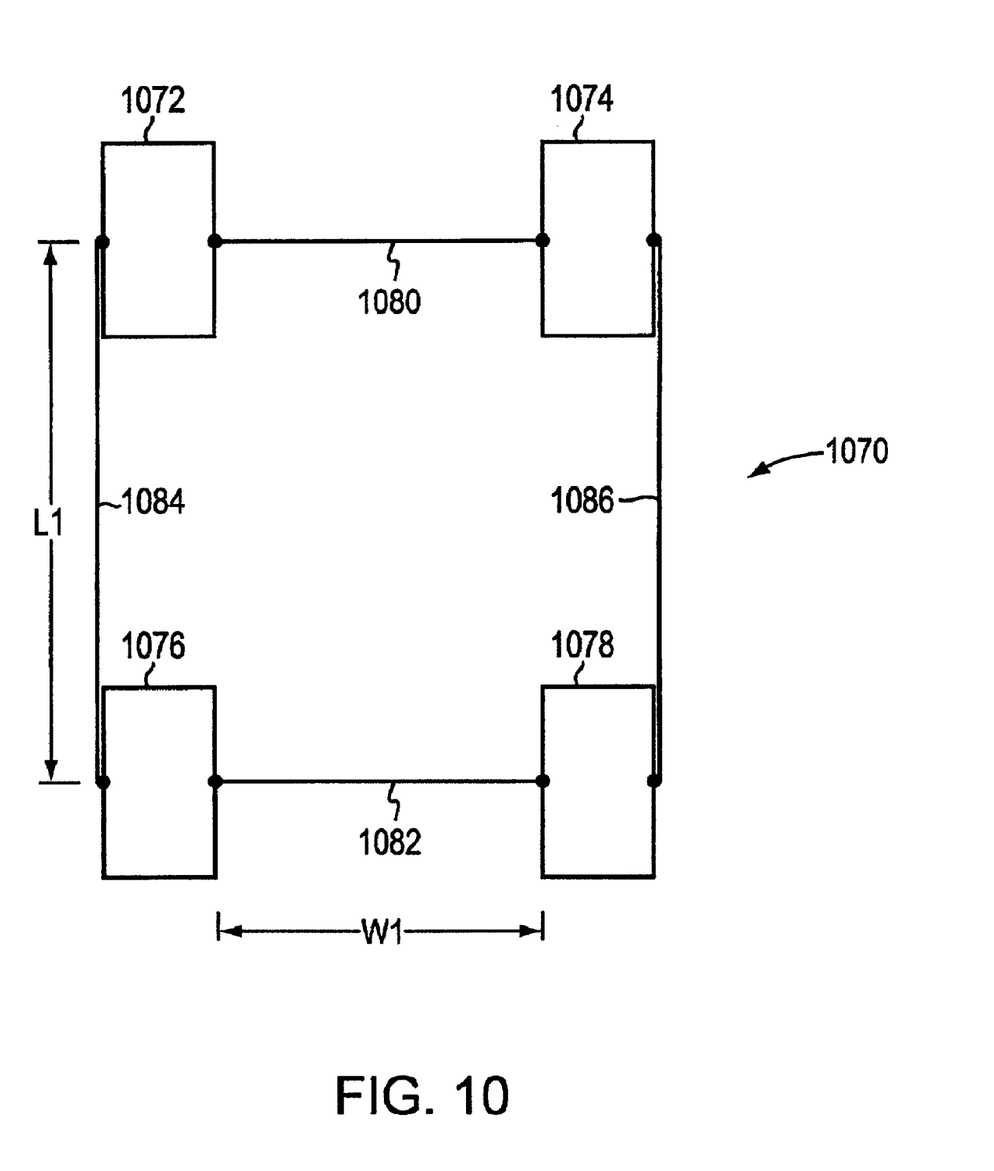
FIG. 10 is a top diagrammatic plan view of a second embodiment of the dolly system of the present invention.

Referring now to FIG. 10, a second four-dolly system embodiment is designated generally by the numeral 1070. The dolly system 1070 includes four dollies 1072, 1074, 1076, and 1078, preferably connected together as an integral system. Each of the dollies 1072, 1074, 1076 and 1078 can be substantially identical to the dollies 1010, 1012 and 1014.

The dolly system 1070 includes a pair of members such as cross rods or bars 1080 and 1082 between the width (W1) of respective pairs of the dollies 1072, 1074 and 1076, 1078. A second pair of rods or bars 1084, 1086 connect the pairs of dollies 1072, 1074 and 1076, 1078 along the length (L1) of the dolly system 1070. Again, the respective rods or bars 1080, 1082, 1084 and 1086, preferably are adjustable to mate with a vehicle (not illustrated) to be loaded onto the dolly system 1070.

In operation of the dolly system 1070, a vehicle to be parked (not illustrated) can be loaded, by first adjusting the width (W1) of the members 1080, 1082 to match that of the vehicle's wheels (not illustrated). The pair of dollies 1072, 1074 is then placed behind one set of the vehicle wheels and the second pair of dollies 1016, 1078 is placed behind the second set of the vehicle wheels. At least one, but preferably all four brakes would be activated to lock the pairs of dollies 1072, 1074 and 1076, 1078 in place once the pairs of dollies 1072, 1074 and 1076, 1078 are located, then the bars or rods 1084, 1086 can be adjusted and connected between the front and rear pairs of the dollies 1072, 1074 and 1076, 1078, as illustrated in FIG. 10.

The vehicle (not illustrated) then can be loaded like the trailer 1024 and the system 1070 can be moved in any direction as desired to maximize use of the physical space, while allowing the owner of the vehicle to maintain the ignition keys after the vehicle has been loaded. Thus, the potential for theft and other vehicle damages is reduced while utilizing the system 1070, while the space required to store the vehicle is minimized.

Those persons skilled in the art readily will understand that, in view of the detailed description of the preferred devices and methods of the present invention, the present invention is susceptible of broad utility and application. Many methods, embodiments, and adaptations of the present invention other than those herein described, as well as many variations, modifications, and equivalent arrangements, will be apparent from or reasonably suggested by the present invention and the detailed description thereof, without departing from the substance or scope of the present invention. Accordingly, while the present invention is described herein in detail in relation to preferred methods and devices, it is to be understood that this detailed description only is illustrative and exemplary of the present invention and is made merely for purposes of providing a full and enabling disclosure of the invention. The detailed description set forth herein is not intended nor is to be construed to limit the present invention or otherwise to exclude any such other embodiments, adaptations, variations, modifications and equivalent arrangements of the present invention, which is limited solely by the claims appended hereto and the equivalents thereof.

What is claimed is:

1. An improved dolly arrangement for moving a vehicle, comprising:
   (a) four dollies including a front pair of dollies and a rear pair of dollies, each dolly of said pairs including two connectors;
   (b) a first member extending between a first said connector of a first dolly of said front pair and a first said connector of a second dolly of said front pair to secure said first and second dollies of said front pair at first fixed distance apart;
   (c) a second member extending between a first said connector of a first dolly of said rear pair and a first said connector of a second dolly of said rear pair to secure said first and second dollies of said rear pair at a second fixed distance apart;
   (d) a third member extending between said second connector of said first dolly of said front pair and said second connector of said first dolly of said rear pair to secure said front pair and said rear pair at a third fixed distance apart;
   (e) wherein at least a particular dolly of said dollies includes,
      (i) an arcuate sure for holding a wheel of a vehicle loaded thereon, and
      (ii) a ramp for loading and unloading of the vehicle,
   said arcuate surface and said ramp being pivotally mounted on a platform of said particular dolly to assist in the loading and unloading of the vehicle.

2. The dolly arrangement of claim 1, further comprising a fourth member extending between said second connector of said second dolly of said front pair and said second connector of said second dolly of said rear pair to further secure said front pair and said rear pair at said third fixed distance apart.

3. The dolly arrangement of claim 1, wherein a said member is adjustable.

4. The dolly arrangement of claim 1, wherein each said member is connected to each said dolly such that the fixed distance at which said dollies are secured is adjustable.

5. The dolly arrangement of claim 1, wherein said dollies are substantially identical to one another and, thus, interchangeable with one another.

6. The dolly arrangement of claim 1, wherein each said dolly includes two connectors.

7. The dolly arrangement of claim 1, wherein each said dolly includes two connectors, said connectors disposed on opposite sides of said dolly.

8. An improved dolly arrangement for moving a vehicle, comprising:
   (a) at least three dollies, a first dolly of said dollies including at least two connectors and a second and a third dolly of said dollies each including at least one connector;
   (b) a first member extending between a first connector of said first dolly and said connector of said second dolly to secure said first dolly and said second dolly at a first fixed distance apart; and
   (c) a second member extending between a second connector of said first dolly and said connector of said third dolly to secure said fist dolly and said third dolly at a second fixed distance apart;
   wherein said dollies are substantially identical to one another and, thus, interchangeable with one another, and further wherein at least a particular dolly of said dollies includes an arcuate surface for holding a wheel of a vehicle loaded thereon, and a ramp for loading and unloading of the vehicle, said arcuate surface and said ramp being pivotally mounted on a platform of said particular dolly to assist in the loading and unloading of the vehicle.

9. An improved dolly arrangement for moving a vehicle, comprising:
   (a) at least three dollies, a first dolly of said dollies including at least two connectors and a second and a third dolly of said dollies each including at least one connector, each of said dollies including a rectangular platform and four rotatable wheels supporting said platform;
   (b) a first member extending between a first connector of said first dolly and said connector of said second dolly to secure said first dolly and said second dolly at a first fixed distance apart; and
   (c) a second member extending between a second connector of said first dolly and said connector of said third dolly to secure said first dolly and said third dolly at a second fixed distance apart;
   wherein at least a particular dolly of said dollies includes an arcuate surface for holding a wheel of a vehicle loaded thereon, and a ramp for loading and unloading of the vehicle, said arcuate surface and said ramp being pivotally mounted on the platform of said particular dolly to assist in the loading and unloading of the vehicle.

10. The dolly arrangement of claim 9, wherein, for each of said dollies, each said platform has an arcuate surface for holding a wheel of a vehicle loaded thereon, said platform including a ramp for loading and unloading of a vehicle.

11. The dolly arrangement of claim 9, wherein, for each of said dollies, said arcuate surface and said ramp are pivotally mounted on said platform to assist in loading and unloading of the vehicle.

* * * * *